(No Model.)

P. S. GRAHAM.
Belt Stretcher.

No. 241,489. Patented May 17, 1881.

Witnesses:

Inventor.
Peter S. Graham

N. PETERS, Photo-Lithographer, Washington, D. C.

UNITED STATES PATENT OFFICE.

PETER S. GRAHAM, OF CUMBERLAND MILLS, MAINE.

BELT-STRETCHER.

SPECIFICATION forming part of Letters Patent No. 241,489, dated May 17, 1881.

Application filed July 1, 1880. (No model.)

*To all whom it may concern:*

Be it known that I, P. S. GRAHAM, of Cumberland Mills, Cumberland county, State of Maine, have invented a new and useful Improvement in Belt-Stretchers; and I do hereby declare that the following is a full, clear, and exact description of the same.

My invention relates to an improvement in devices or apparatus for temporarily connecting the ends of a belt, so that the slack may be taken up without necessitating the detachment of the belt from the pulleys on which it runs.

The main parts of my apparatus are clamps for holding the belt, screws for connecting said clamps, and gearing for rotating the screws to bring the clamps nearer each other, and thereby strain the belt tightly. Such combination of parts is, however, not broadly new, and my invention consists in a certain feature hereinafter described and claimed.

Figure 1:
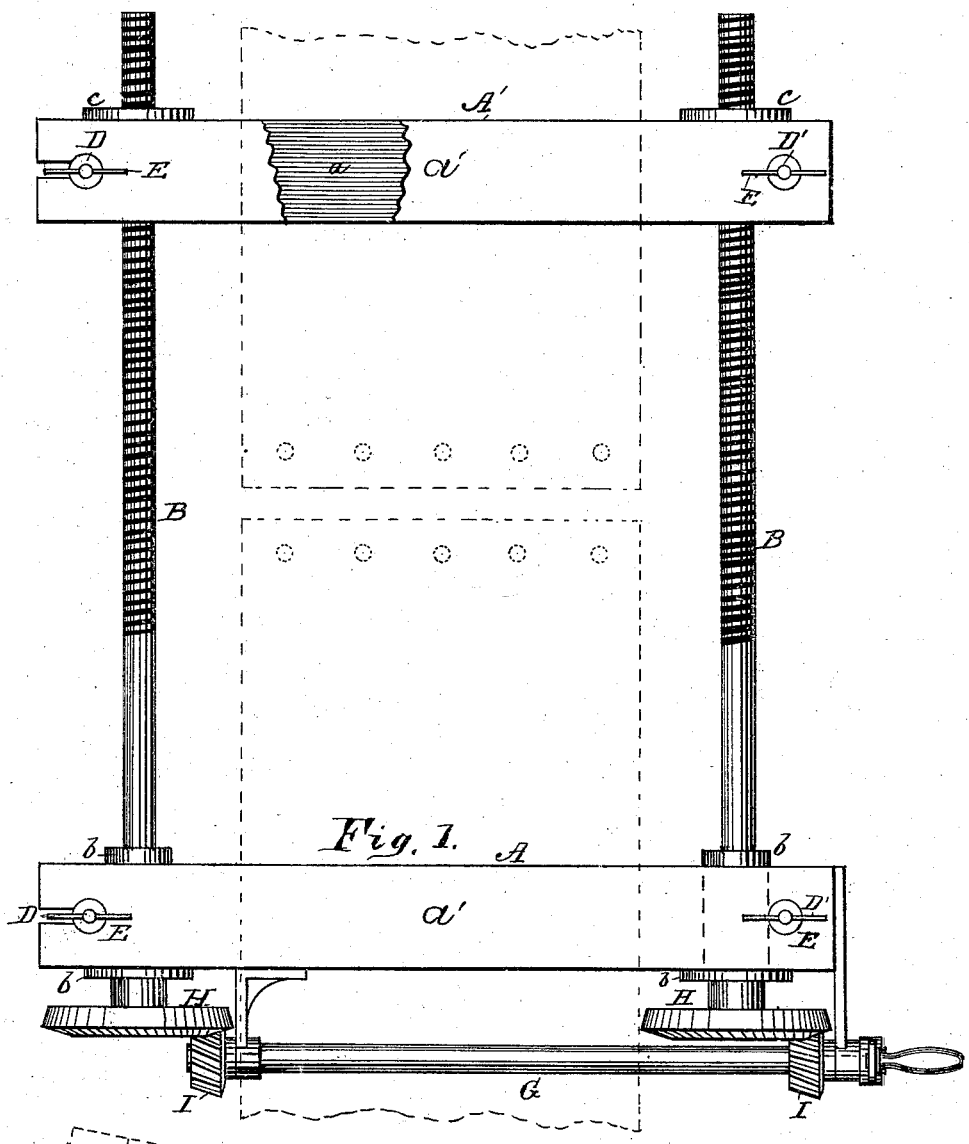
Figure 2:
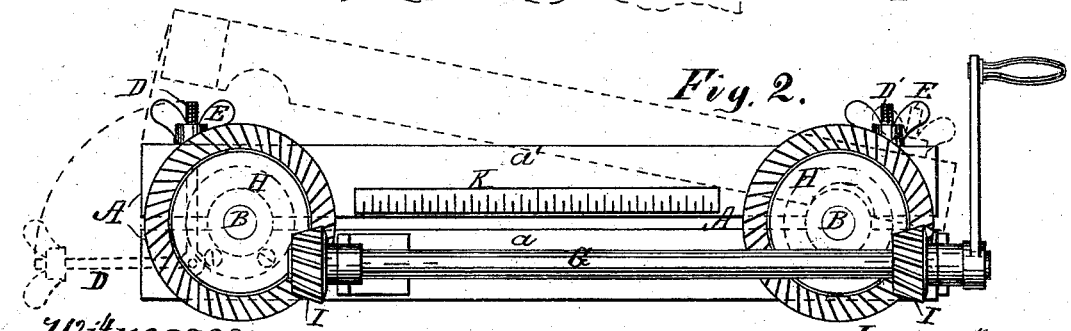

In the accompanying drawings, forming part of this specification, Figure 1 is a plan view, and Fig. 2 an end view, of my improved belt-stretcher.

Letters A A' indicate the two belt-clamps, and B B the screws that connect them. Each clamp consists of two jaws, $a$ $a'$, formed of straight bars arranged parallel one above the other. The screws B B are attached to the lower bar or jaw, $a$, of each clamp, but are disconnected from the upper jaw. The means of such attachment are sleeves $b$ and $c$, which are affixed to the respective lower jaws, $a$ $a$. By rotating the screws B the clamp A' will either approach or recede from the other clamp, A, since the screws work through the internally-threaded sleeves $c$ and cause them to travel one way or the other, while the sleeves $b$ remain fixed on the screws, which rotate freely therein. The two jaws $a$ $a$ of each clamp A A' are held together by screw-rods D D', having lever or thumb-nuts E. The rods D are pivoted to the lower jaws, $a$, and pass through slots in the ends of the upper jaws, $a'$, so that said rods may be turned down into position shown in dotted lines to allow the apparatus to be applied to or removed from a belt. The other rods, D', project through enlarged holes in the upper jaws, $a'$.

The feature constituting my improvement is the construction and arrangement of parts whereby the belt is held and subjected to tension in the same plane with the axes of the screws B B without interfering with the crank-shaft by which the screws are operated. The two jaws $a$ $a'$ of each pair of clamps A A' meet on lines which are in the same plane with the axes of the screws. If, therefore, the crank-shaft G, by which rotation is imparted to the screws B B, were provided with ordinary bevel-gears and arranged in the usual way, its axis would also lie in the same plane with the screws, and hence a belt could not be drawn straight, but would describe a curve in passing over such crank-shaft. In order to avoid such result I provide the crank-shaft G with gears of such construction that it may be arranged below the plane of the screws and thus be out of the way of the belt while being stretched. The said gears are indicated by letters I. In the broad sense they are bevel-gears—that is to say, the faces of their cogs are oblique to the shaft, but the cogs are placed at an inclination to radii and tangents of the gears, which adapts them to work in mesh with the bevel-gears H, fixed on the heads of the screws B B, although the points of contact between the gears H I are below a line drawn through the center of the gears H. Thus, without increasing the number of parts required to form such a belt-stretching apparatus as heretofore constructed, I arrange the parts so as to operate with the least friction and strain, and without deflecting the belt up or down.

A graduated plate, K, is affixed to the clamp A for use in adjusting the belt equidistant between the screws B.

What I claim is—

In a belt-stretching apparatus, the combination of the crank-shaft G, having gears I, whose cogs are oblique to radii of the same, and bevel-gears H, having similar oblique cogs, with the screws B B and the clamps A A, between whose jaws said screws are arranged, as shown and described, whereby the crank-shaft is adapted to be located below the plane of the axes of the screws, as specified.

PETER S. GRAHAM.

Witnesses:
CHAS. R. GOODELL,
JNO. E. WARREN.